United States Patent [19]

Galais et al.

[11] Patent Number: 4,575,315
[45] Date of Patent: Mar. 11, 1986

[54] DEVICE FOR PROVIDING FLUID-TIGHTNESS OF A SUBMERSIBLE MOTOR AND A MOTOR INCORPORATING SAID DEVICE

[75] Inventors: Michel Galais, Angouleme; Christian Sardain, Delle; Jean Fouin, Angouleme; Marcel Arnaudeau, Paris; Pierre Morin, Levallois-Perret, all of France

[73] Assignee: Moteurs Leroy-Somer, Angouleme, France

[21] Appl. No.: 500,178

[22] Filed: Jun. 1, 1983

[30] Foreign Application Priority Data

Jun. 4, 1982 [FR] France .................. 82 09746

[51] Int. Cl.$^4$ .................. F04B 39/02; H02K 5/12
[52] U.S. Cl. .................. 417/365; 417/368; 417/414; 310/87; 310/90
[58] Field of Search .................. 417/366, 424, 414, 365, 417/368, 371, 357, 367, 369, 370, 372; 310/87, 90

[56] References Cited

U.S. PATENT DOCUMENTS

| | | |
|---|---|---|
| 2,002,916 | 5/1935 | Mendenhall et al. . |
| 2,363,419 | 11/1944 | Howard .................. 417/367 |
| 2,568,548 | 9/1951 | Howard et al. . |
| 2,783,400 | 2/1957 | Arutunoff .................. 417/424 |
| 2,790,916 | 4/1957 | Hinman .................. 417/424 |
| 3,075,469 | 1/1963 | Lane .................. 417/414 |
| 3,242,360 | 3/1966 | Carle .................. 310/87 |
| 3,671,786 | 6/1972 | Jones .................. 310/87 |

FOREIGN PATENT DOCUMENTS 2105902 4/1972 France .

Primary Examiner—Cornelius J. Husar
Assistant Examiner—Peter M. Cuomo
Attorney, Agent, or Firm—Young & Thompson

[57] ABSTRACT

A method for ensuring fluid-tightness is applicable to a submersible motor for operation under conditions of total and permanent immersion, especially in oil wells and geothermal boreholes. The emergent end of the drive shaft of the motor is fitted with a rotary packing-gland. The motor casing is filled with oil which is circulated via an axial duct of the drive shaft, the impulse being produced by a disk pierced by radial ducts. A second circuit constituted by a system of ducts including radial ducts comes into contact with the packing-gland which is at overpressure with respect to the external medium. This results in a controlled leakage flow between the two portions of the packing-gland.

7 Claims, 3 Drawing Figures

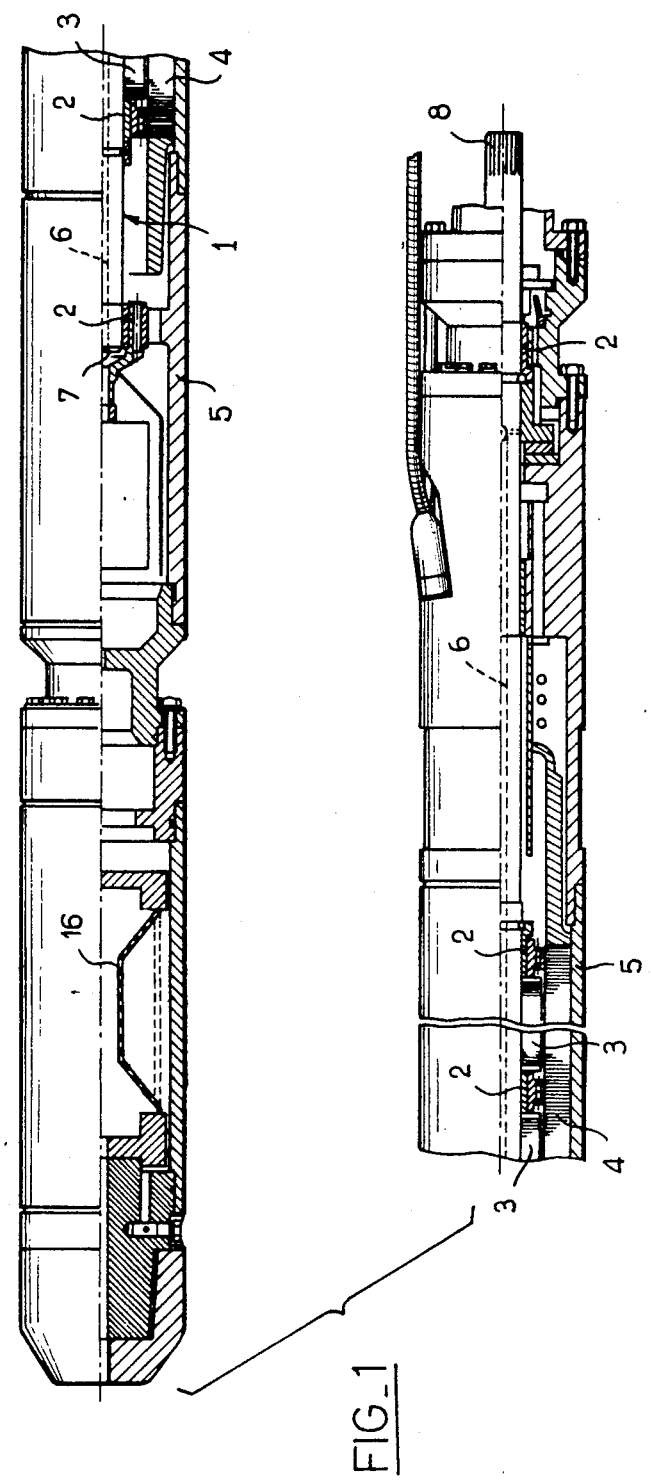
FIG_1

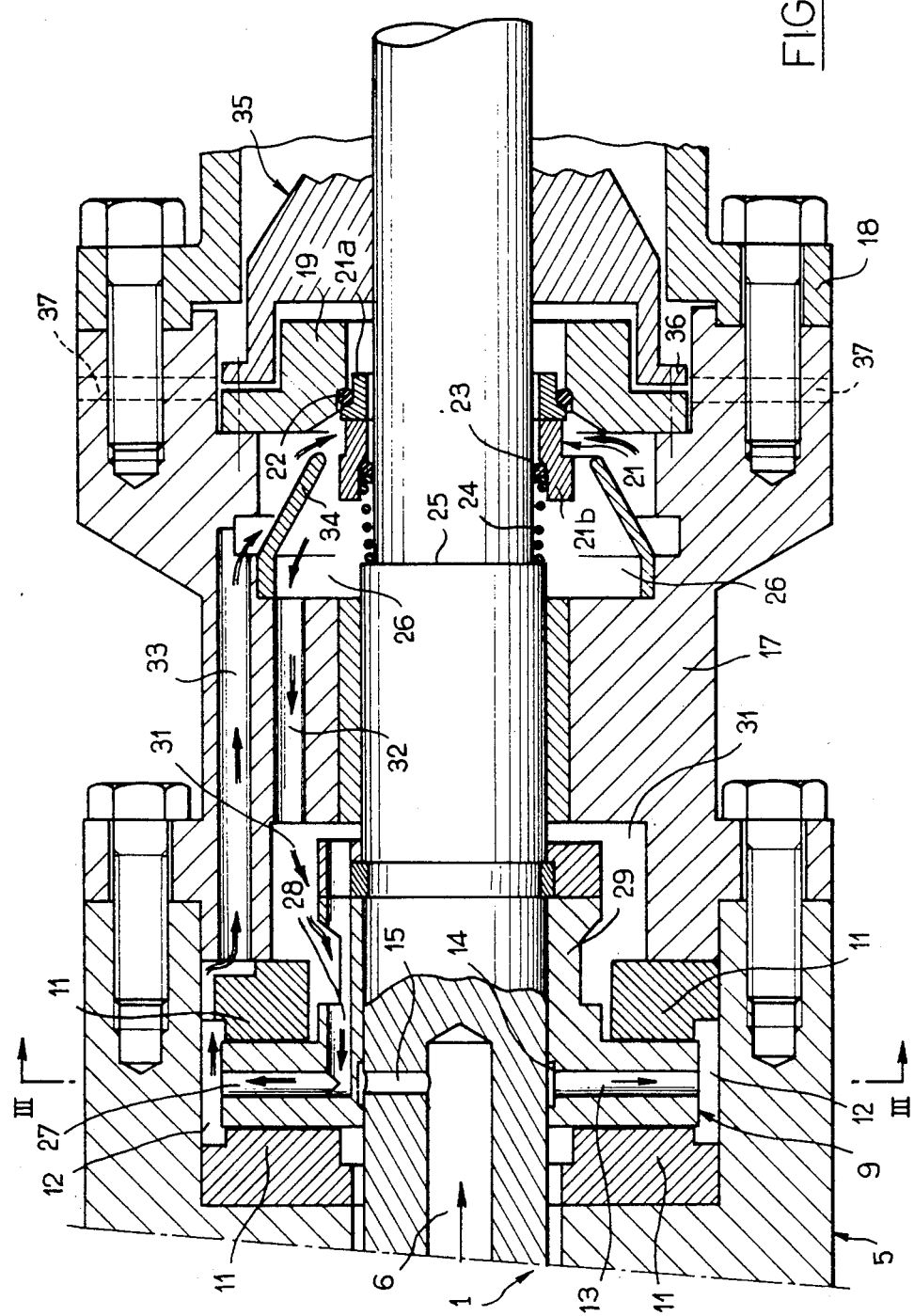
FIG_2

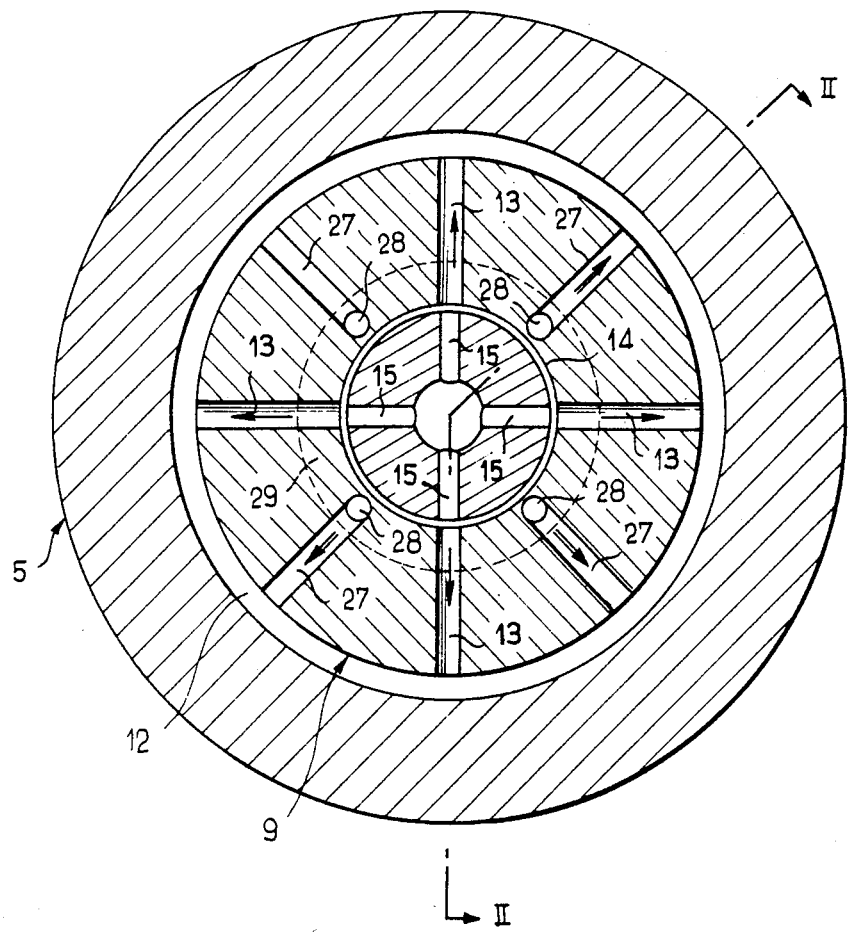
FIG_3

DEVICE FOR PROVIDING FLUID-TIGHTNESS OF A SUBMERSIBLE MOTOR AND A MOTOR INCORPORATING SAID DEVICE

This invention relates to a device for providing fluid-tightness of a submersible motor.

The invention also relates to a motor which makes use of said device and is intended to operate in total and continuous immersion, especially for driving pumps in wells and boreholes.

An electric motor of this type is housed within a cylindrical casing and usually coupled to an axial pump. Said motor casing is provided with a rotary packing-gland for the emergent end of the motor shaft, one component of the packing-gland being rigidly fixed to the shaft and the other component being rigidly fixed to the casing.

The motor casing is filled with oil which is intended in particular to lubricate the motor bearings, to cool the windings and to establish a uniform temperature. In some types of motor, a system is provided for circulation of the oil by pumping.

The motor may have a reserve supply of oil contained within a variable-volume reservoir which is in contact with the external medium in order to establish a pressure equilibrium between the interior and the exterior of the motor casing.

However, operation at pressure equilibrium is usually incompatible with good performance of the rotary packing-gland. The pumped fluid in fact always contains mineral impurities which are liable to penetrate between the two cooperating portions of the packing-gland and to result in rapid destruction of this latter.

An attempt has been made to solve this problem by establishing an overpressure of the oil contained in the motor on the packing-gland in order to produce an oil leakage flow to the exterior of the motor and thus to scavenge or discharge the impurities. This overpressure can be obtained by means of a spring-actuated piston and the range of travel of the piston defines the period of utilization of the pump set. One disadvantage of this expedient lies in the fact that a large overpressure appears at the beginning of the operation and produces a high leakage flow rate. Furthermore, the variations in temperature of the driving fluid (which are considerable at the time of stoppages of the pump set) produce variations in volume which in turn result in reciprocating motion of the piston. Fluid-tightness between the piston and its cylinder is progressively destroyed as a result of corrosion of the system which is in contact with the pumped fluid. Furthermore, the periods of utilization thus obtained are reduced to an appreciable extent.

The object of the invention is to provide a sealing device for a motor in which the rotary packing-gland is protected by means of a substantially constant overpressure applied under optimum conditions.

This result is obtained in accordance with the invention by providing two lubricating and cooling fluid-circuits within the motor casing. The first circuit contains a fluid under high pressure for ensuring pressurization of the motor casing in the vicinity of the rotary packing-gland and then lubrication and cooling of the motor portion. The second circuit containing fluid at a slight overpressure with respect to the first circuit is adapted to ensure lubrication and cooling within the region which is pressurized by the first circuit. The low-pressure zone of the first circuit is connected to a reservoir and so arranged as to subject the fluid contained therein to the pressure of the external medium and to a temperature which is very close to the temperature of said medium. The high-pressure zone of the first circuit is located near the packing-gland on the same side as the protective fluid and is obtained by first centrifugal pumping means keyed on the shaft as near as possible to said packing-gland. Protective fluid is supplied from the reservoir to said first pumping means via ducts and is returned into the annular space between the stator and the rotors, thus having the effect of cooling the motor before returning to the low-pressure zone along the walls outside the stator of the submerged casing. The second circuit is obtained by second centrifugal pumping means keyed on the shaft in the high-pressure zone of the first circuit and adapted to utilize the ducts which permit lubrication and cooling of the high-pressure zone of the first circuit. Said second circuit has in common with said first circuit a peripheral space which is supplied with protective fluid from the low-pressure zone of the first circuit via the ducts aforesaid at a temperature in the vicinity of the temperature of the external medium.

A device provided with two oil circuits makes it possible to separate on the one hand the functions of internal cooling and lubrication of the electric motor which call for an appreciable flow rate and on the other hand the function of pressurization of the packing-gland which entails the need for high overpressure but a low rate of flow. Thus the low flow rate in the vicinity of the packing-gland has the effect of reducing to a minimum the associated effects of turbulence and pressure oscillations which produce an increase in leakage towards the exterior.

Furthermore, establishment of the first pressure circuit by means of centrifugal pumping means keyed on the shaft has the advantage of being both simple and reliable.

In a preferred embodiment of the invention, the second lubricating and cooling circuit is obtained by second centrifugal pumping means integrated in the member which carries the first pumping system.

This arrangement is simple and reliable and permits in particular an appreciable reduction in internal bulk of the two pumping systems since they are generally limited to a disk keyed on the shaft.

In an advantageous embodiment, said disk is a thrust-bearing disk keyed on the shaft and adapted to ensure axial positioning of the drive shaft as well as the means for pumping the two circuits via radial ducts pierced within the thickness of said shaft. A first series of said ducts constitutes the first pumping means and establishes a communication between a duct which is coaxial with the shaft and a peripheral space which is in relation with the two circuits. A second series of ducts closes the second circuit and constitutes the circulation means of said second circuit.

The above-mentioned disk performs all three functions at the same time (thrust-bearing member, pump of the first circuit, pump of the second circuit), is particularly compact and further reduces the overall length of the motor.

In an advantageous arrangement, the motor is provided with means for ensuring that the protective fluid which circulates within the ducts serves to cool the thrust-bearing disk used as a pumping system.

This arrangement makes it possible to cool the thrust-bearing member without having to provide an additional circuit since the oil circulates within ducts formed in said thrust-bearing member; cooling of this latter is thus particularly efficient.

It is an advantage to provide outside the motor casing and in immediate proximity to the packing-gland of the shaft a protection member which is keyed on said shaft externally of the rotary mechanical packing-gland with respect to the motor casing. Said protection member has a peripheral flange which extends to the vicinity of the casing in order to constitute in conjunction with said casing a labyrinth seal having a centrifugal action.

This arrangement makes it possible to remove the majority of impurities which may be present in the vicinity of the exterior of the packing-gland, on the one hand as a result of a centrifugal driving action and on the other hand by virtue of the fact that the leakage flow through the packing-gland has the effect of washing the internal space between said packing-gland and said protection member.

Other features of the invention will be more apparent upon consideration of the following description and accompanying drawings, wherein:

FIG. 1 is a truncated longitudinal view in half-section showing the motor and the fluid-tight coupling with the pump;

FIG. 2 is an enlarged sectional view of the fluid-tight coupling zone, this sectional view being taken along line II—II of FIG. 3;

FIG 3 is a transverse sectional view taken along line III—III of FIG. 2.

Referring to FIG. 1, the motor of the motor-driven pump comprises a shaft 1 which is carried by a plurality of bearings 2 and on which are keyed a plurality of rotors 3, said rotors being adapted to cooperate with a stator which is rigidly fixed to a casing 5.

The shaft 1 is bored practically throughout its entire length so as to form an axial duct 6 which has its opening at the shaft end 7 opposite to the end 8 which is coupled with the pump shaft (not shown in the drawings).

Near the end 8 located in the vicinity of the pump, the shaft 1 is adapted to carry a disk 9 (as shown in FIGS. 2 and 3) which is keyed on said shaft and applied against axial-thrust shoes 11. Said disk is housed within a cavity of the motor casing 5 and surrounded by a peripheral space 12. There are pierced in the thickness of said disk a first series of radial ducts 13 which open on the one hand into said peripheral space and on the other hand into an annular recess 14 which communicates with the radial ducts 15 of the shaft 1 and these latter open into the axial duct 6 of said shaft.

Since the motor casing 5 is filled with oil, it is apparent that, under the action of centrifugal force produced by rotation of the disk 9, a circulation of oil is established through the stator and the rotors towards the left-hand side of FIG. 1 and the return takes place via the axial duct 6 and the peripheral space 12 which constitutes the high-pressure zone of the circuit. This first oil circuit is represented simply by an arrow in FIGS. 2 and 3.

A reserve supply of oil having a variable volume and in communication with the motor is located in the lower portion of this latter between the casing 5 and a flexible diaphragm 16. Said diaphragm is in contact the external medium in order to establish an equal of pressure between said external medium and that portion of the motor casing which is farthest from the pump.

An intermediate member 17 connects the motor casing 5 to a pump body 18. There is fixed within said member a bearing ring 19 on which rests the stationary portion 21a of a rotary packing-gland 21 by means of an O-ring 22. Tne moving portion 21b of said packing-gland is fixed on the shaft 1 by means of an O-ring seal 23 and is applied against the stationary portion by means of a spring 24 which bears on an annular shoulder 25 of the shaft. The member 17 is provided with a cavity 26 in the vicinity of the packing-gland.

The disk 9 is provided with a second series of radial ducts 27 which are formed within its thickness and open on the one hand into the peripheral space 12 and on the other hand into a corresponding number of longitudinal ducts 28 formed in a sleeve 29 which extends the disk towards the emergent end of the shaft.

The ducts 28 open into a cavity 31 of the member 17 which communicates with the cavity 26 via ducts 32 arranged in a barrel configuration. Other ducts 33, also arranged in a barrel pattern, serve to establish a communication between the peripheral space 12 and the cavity 26. There is therefore provided a second oil circuit (represented by a double arrow in FIGS. 2 and 3). In this second circuit, the oil which leaves the space 12 under the action of rotation of the disk reaches the cavity 26, then flows in the vicinity of the packing-gland 21 and returns via the ducts 32. A deflector 34 placed within the cavity 26 causes the oil to flow in very close proximity to the plane of cooperation of the two portions of the packing-gland.

Said second oil circuit shares with the first circuit the peripheral space 12 in which the oil of both circuits is mixed, thus producing a cooling action on the packing-gland.

Furthermore, by reason of the pressure drop in the airgap between stators and rotors which constitutes the return of the first circuit, rotation of the disk 9 produces an overpressure within the peripheral space 12 with respect to the axial duct 6 which is in turn substantially at the pressure of the surrounding medium as a result of the balancing system located in the lower portion of the motor. This overpressure is transmitted to the cavity 26 via the ducts 33. In the example described, the first circuit is so designed as to ensure that said overpressure is of the order of 1 bar in the vicinity of the packing-gland.

Under the action of said overpressure, the two packing-gland components permit a leakage flow which, under these conditions, is of the order of 1 cm$^3$/hr and is automatically replaced within the motor casing by continuous withdrawal from the reserve supply provided in the lower portion of the motor.

This very small flow of clean fluid permits operation under optimum conditions over a period of several thousand hours without any need to disassemble the motor-driven pump for refilling, this being made possible by the volume of the reservoir.

The low value of fluid flow has the further advantage of requiring only a very small clearance between the two portions of the packing-gland so that, in practice, they never cease to cooperate under the specified conditions.

Despite its low value, said leakage flow is sufficient to prevent intrusion of any solid particle derived from the pumped fluid and liable to come into contact with the friction faces of the packing-gland.

The invention also makes it possible to produce a leakage flow which is predetermined and constant throughout the duration of the reserve supply of oil.

A protection member 35 is keyed on the shaft 1 on the external side of the packing-gland 21 with respect to the casing 5. Said protection member has a peripheral flange 36 which extends to the vicinity of the motor casing. Furthermore, said flange closely corresponds to the shape of the bearing ring 19 so as to form a labyrinth seal constituting a dynamic barrier which prevents any penetration of impurities in contact with the packing-gland.

Radial ducts 37 are formed in the casing 5 opposite to the labyrinth seal for removal of the oil leakage flow.

As can readily be understood, the invention is not limited to the example hereinabove described but extends to any alternative form within the capacity of those versed in the art.

In particular, the term "oil" must be considered as designating any lubricating and/or cooling fluid.

What is claimed is:

1. A device for providing fluid tightness of a submersible motor, said motor comprising a casing, a shaft having an emergent end extending through one end of said casing, said shaft supporting at least one rotor adapted to cooperate with a stator supported by said casing, said casing being provided with a rotary packing gland for said emergent end of said shaft, said casing being filled with a lubricating and cooling fluid under pressure and including tight means for maintaining the overall pressure of said lubricating and cooling fluid at a level subsantially equal to that of an external medium, said device comprising a first circuit means providing an overpressure in a zone adjacent to said rotary packing gland, wherein said device comprises a second circuit means for providing a further increase of pressure within said zone.

2. A motor equipped with a device according to claim 1 wherein said motor comprises a thrust-bearing disk keyed on said shaft and adapted to ensure axial positioning of said motor shaft and to form said first and second circuit means via radial ducts pierced within the thickness of said shaft, a first series of said ducts being such as to constitute said first circuit means and to establish a communication between a duct which is coaxial with said shaft and a peripheral space which is in communication with said first and second circuit means, and a second series of ducts which forms said second circuit means constitutes circulation means of said second circuit means.

3. A device according to claim 1 wherein said first and second circuit means include centrifugal pumping means keyed on said motor shaft.

4. A device according to claim 1 wherein said tight means include a variable volume connected to the casing and having a flexible wall in contact with said external medium.

5. A motor according to claim 2, wherein said motor is provided with means for ensuring that the protective fluid which circulates within the ducts serves to cool the thrust-bearing disk which is used as a pumping system.

6. A motor according to claim 2, wherein said motor comprises menas whereby the protective fluid of the peripheral space which is in relation with both circuits is continuously renewed by mixing of said fluid with the fluid supplied from a low-pressure zone at a temperature in the vicinity of the temperature of the external medium by the first pumping system.

7. A motor according to claim 5, wherein said motor comprises a protection member keyed on the shaft on the external side of the rotary mechanical packing-gland with respect to the motor casing, said protection member being provided with a peripheral flange which extends to the vicinity of the casing in order to constitute in conjunction with said casing a labyrinth seal having a centrifugal action.

* * * * *